Feb. 26, 1929.
R. H. WAPPLER
1,703,215
OBJECTIVE SYSTEM FOR SURGICAL TELESCOPES.
Filed Feb. 8, 1927
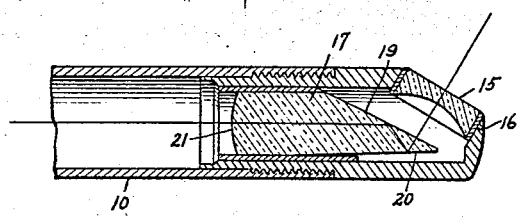
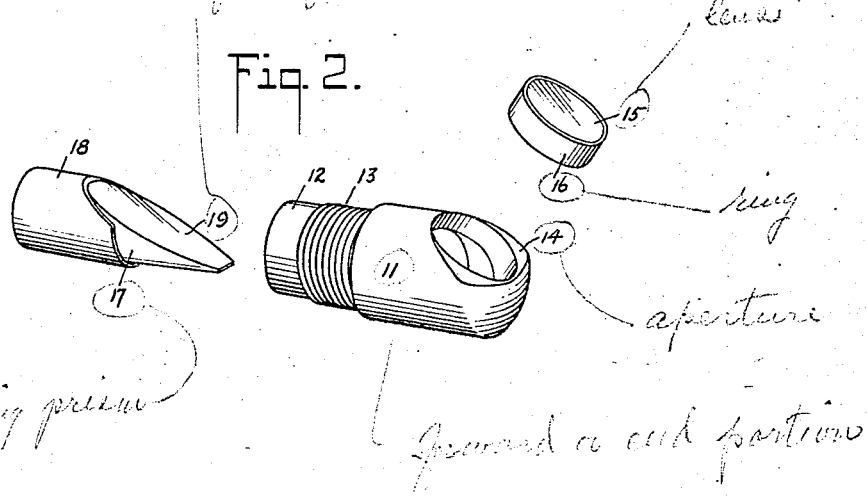
Reinhold H. Wappler
INVENTOR
BY
Frederick Breitenfeld
his ATTORNEY Patented Feb. 26, 1929.

1,703,215

UNITED STATES PATENT OFFICE.

REINHOLD H. WAPPLER, OF YONKERS, NEW YORK.

OBJECTIVE SYSTEM FOR SURGICAL TELESCOPES.

Application filed February 8, 1927. Serial No. 166,719.

My present invention relates generally to surgical telescopes, and has particular reference to an objective system for association with such a device.

In the employment of surgical telescopes, either alone or in combination with endoscopic tubes, it is highly desirable that the operator be enabled to command the largest possible field of vision with a maximum amount of illumination and a minimum amount of distortion. Particularly in cases where the instrument is employed for the illumination of very narrow cavities, the objective system of the telescope must be of such a character as to afford the operator a clearly illuminated field of vision unaffected from the standpoint of distortion by the extreme closeness of the area being examined.

It is an object of the present invention to provide a telescope of this character with an objective system having the desired advantageous features. More particularly, it is an object to provide an objective system which permits a maximum field of vision even in cavities of extremely small cross-section, which reduces distortion to a minimum, and which is extremely efficient from the standpoint of illumination and light-transmitting qualities.

Another object of the invention is to provide such a device in a simple and uncomplicated form, thereby rendering its manufacture extremely inexpensive from the standpoint of material, time, and skill.

Briefly, my invention contemplates the provision of an optical system which comprises in combination a concave lens and an optical device such as a double acting prism for receiving and transmitting the light rays passing through the lens.

For the attainment of the foregoing objects and such other objects as may hereinafter appear or be pointed out, I have illustrated one form of my invention in the accompanying drawings in which—

Fig. 1 is a longitudinal cross-sectional view of the inner end of a telescopic tube embodying the features of my invention; and Fig. 2 is an exploded view of certain of the elements shown in Fig. 1.

Referring to the drawings, and particularly to Fig. 1, it will be observed that I have shown my optical system arranged in an end portion of a telescopic tube 10, it being understood that the latter may, if desired, be provided with the usual lenses and other optical arrangements for transmitting the light rays therethrough.

In the embodiment shown, I have provided an end portion or cap within which the optical instruments of the present invention are arranged. As to certain phases of my invention, such a cap is not essential, but a construction of this character is highly desirable from the standpoint of manufacture.

Reference to Fig. 2 will show that the cap may consist of a forward portion 11 whose outer periphery is adapted to lie flush with the outer periphery of the tube 10 and thereby form a smooth continuation thereof. The cap may also be provided with a stem portion 12 of slightly reduced diameter and externally threaded as at 13, the threads 13 being adapted to engage with corresponding internal threads provided in the end of the tube 10.

The forward portion 11 is provided with a beveled face 14 having an opening therein adapted to receive the concave lens 15. The latter is preferably mounted initially in a ring 16 adapted to fit snugly into the opening in the face 14 and to be held in place either frictionally, by cement, or by any other suitable means.

The lens 15 is preferably arranged with a plane outer surface adapted to lie flush with the face 14, so that when the lens is in place, the forward end of the telescope will be totally devoid of any objectionable protruding portions or edges.

Mounted within the cap, I have provided a double acting prism 17 whose side surfaces may be substantially cylindrical so as to permit the mounting thereof in a small sleeve 18 adapted to fit snugly within the cap. The prism is provided with a front face 19 arranged to lie in a plane substantially perpendicular to the axis of the lens 15 and forming an acute angle with the major axis of the prism and hence of the telescope as a whole. The forward portion of the prism is shaped to provide a side face 20 lying in a plane almost parallel to the axis of the prism and rendering the forward portion of the prism substantially wedge-shaped.

The faces 19 and 20 are so arranged that light rays passing through the front face 19 will strike upon the side face 20, will be reflected by the latter back to the front face 19, and will be re-reflected, by internal reflection, into a substantially longitudinal direction. For the sake of clearness, a perpendicular ray passing through the center of the lens 15 is shown in Fig. 1, and the path of this ray is clearly disclosed in this figure. If desired, the face 20 may be silvered so as to increase its reflecting properties.

In Fig. 1, I have shown the rear face 21 of the prism convexly shaped, although such a configuration is not essential from the standpoint of the present invention.

Although I have shown the prism 17 mounted within a sleeve 18, it will be understood that an arrangement of this character is not necessarily required, the essence of the invention lying in the mutual arrangement of the lens 15 and the prism 17 as shown in Fig. 1. It will be observed that the nature of my invention permits the lens 15 to be mounted obliquely with respect to the axis of the telescope. In this way, the lens will be slightly spaced from the walls of any minute cavity being examined. This spacing of the lens from the wall of the cavity enhances the clearness of the vision obtained.

The minimizing of distortion is further assured by the provision of the concave lens 15, quite apart from any specific location thereof, it being well known that a concave lens produces a minimum of distortion at even extremely close proximity to an object being viewed.

The provision of the concave lens 15 has the additional desirable feature of enlarging the so-called "entrance pupil" of the entire system; and in this way, the illumination or light-transmitting qualities of a telescope equipped in this manner are of an extremely high character. At the same time, the field of vision commanded by the lens 15 is a relatively large one, being substantially defined by an imaginary cone whose axis coincides with the axis of the lens 15 and whose apex lies closely adjacent to the inner surface of said lens.

The advantageous characteristics of my invention, illustratively exemplified by the advantageous features just enumerated render the device extremely efficient. Even where the telescopic tube is employed for the examination of relatively small cavities whose walls tend to hug the sides of the tube, the character and range of the field of vision are exceptionally good. It is contemplated that a telescope constructed in accordance with the present invention will be employed in association with an incandescent lamp which may be arranged in a separate tube alongside of the telescope or forwardly of the telescope and within the calibre of the latter. In the latter case, the disposition of the lens 15 in the oblique manner shown will facilitate the proper illumination of the area being examined. Furthermore, the provision of the double acting prism will produce an ultimate image which is not only well illuminated and undistorted, but which is erect and uninverted.

It will be obvious that many changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. A telescope of the character described, comprising a forward portion having a beveled face, said face having an opening therein, a concave lens mounted in said opening, and optical means mounted in said forward portion and behind said lens for receiving the light rays passing through the lens and transmitting them longitudinally through the tube, said optical means being arranged and constructed to render the image transmitted erect and uninverted, and said means comprising a double acting prism having a light-receiving face disposed in the path of the light rays passing through the lens and substantially perpendicular to the axis of the lens.

2. A telescope of the character described, comprising a closed inner end portion having a beveled face lying in a plane oblique with respect to the tube axis, said face having an opening therein, a concave lens mounted in said opening and having a plane outer surface substantially flush with said face, and optical means mounted in said end portion for receiving the light rays passing through the lens and transmitting them in an erect and uninverted manner longitudinally through the tube.

3. An objective system for a telescopic tube of the character described, said system comprising a concave lens mounted in a wall of the tube, and a double acting prism behind said lens, said prism being so constructed and arranged as to transmit the light rays passing through the lens in a longitudinal direction through the telescope, and said prism having a light-receiving face substantially perpendicular to the axis of said concave lens.

4. An objective system for a telescopic tube of the character described, said system comprising a concave lens mounted in a wall of the tube, and a double acting prism behind said lens, said prism being so constructed and arranged as to trasmit the light rays passing through the lens in a longitudinal direction through the telescope, and said prism having a front face substantially perpendicular to the axis of the lens, and a side face so arranged with respect to the rays passing through the lens and through said front face as to reflect said rays back onto the front face in directions which will cause said rays to be internally re-reflected into said longitudinal direction.

5. An objective system for a telescopic tube of the character described, said system comprising a concave lens mounted obliquely in a forward wall portion of the tube so as to command an obliquely forward field of vision substantially defined by a cone whose axis coincides with the axis of the lens, and a double acting prism behind said lens, said prism including a front face arranged behind said lens along a plane substantially perpendicular to the axis of the lens, and said prism being so constructed and arranged as to transmit the light rays passing through the lens and through said front face in an erect and uninverted manner longitudinally through the telescope.

In witness whereof, I have signed and sealed this specification this 3 day of February, 1927.

REINHOLD H. WAPPLER.